United States Patent [19]

Stuber

[11] 4,154,250
[45] May 15, 1979

[54] DRIVE MECHANISM AND SUPPORT ARRANGEMENT FOR AGITATOR OF AXIAL FLOW THRESHING CYLINDER

[75] Inventor: Michael R. Stuber, Raytown, Mo.

[73] Assignee: Allis-Chalmers Corporation, Milwaukee, Wis.

[21] Appl. No.: 883,225

[22] Filed: Mar. 3, 1978

[51] Int. Cl.² .............................................. H01D 41/12
[52] U.S. Cl. ................................... 130/27 H; 56/14.6
[58] Field of Search ............. 130/27 R, 27 H, 27 HA, 130/27 Q, 27 T; 56/14.5, 14.6, 122-125

[56] References Cited

U.S. PATENT DOCUMENTS

| | | | |
|---|---|---|---|
| 2,811,158 | 10/1957 | Rietmann | 130/27 Q |
| 3,306,302 | 2/1961 | Mark et al. | 130/27 H |
| 3,430,633 | 3/1969 | Mark et al. | 130/27 R |
| 4,103,691 | 8/1978 | Shaver | 130/24 |
| 4,108,150 | 8/1978 | Shaver | 130/27 H |

Primary Examiner—Russell R. Kinsey
Attorney, Agent, or Firm—Robert C. Sullivan

[57] ABSTRACT

An improved drive mechanism and support arrangement for an agitator device used for preventing an accumulation of straw or the like on the upper outer peripheral surface of a screen-like cylindrical cylinder cage surrounding an axial flow threshing cylinder which rotates within the screen-like cage. The agitator device comprises a "main beam" which extends axially of and in overlying relation to the upper outer peripheral surface of the cylinder cage. A plurality of arcuate scraper fingers are mounted on and move with the "main beam" and extend in contiguous overlying relation to the outer periphery of the cylinder cage. A carriage member secured to the agitator device is mounted for sliding movement on a pair of horizontal guide rails. Reciprocating movement is imparted to the slidable carriage and to the agitator device by an endless drive chain which is driven at a constant speed and with a continuous motion. The slidable carriage is connected to the drive chain through a drive link which is pivotally connected at its opposite ends to the drive chain and to the slidable carriage. The pivotal connection of the drive link to the chain follows the path of movement of the chain, whereby to cause reciprocatory motion of the slidable carriage and of the agitator device. As the agitator device reciprocates above the screen-like cylinder cage, the scraper fingers of the agitator device agitate and loosen any straw on the upper outer peripheral surface of the cylinder cage.

7 Claims, 6 Drawing Figures

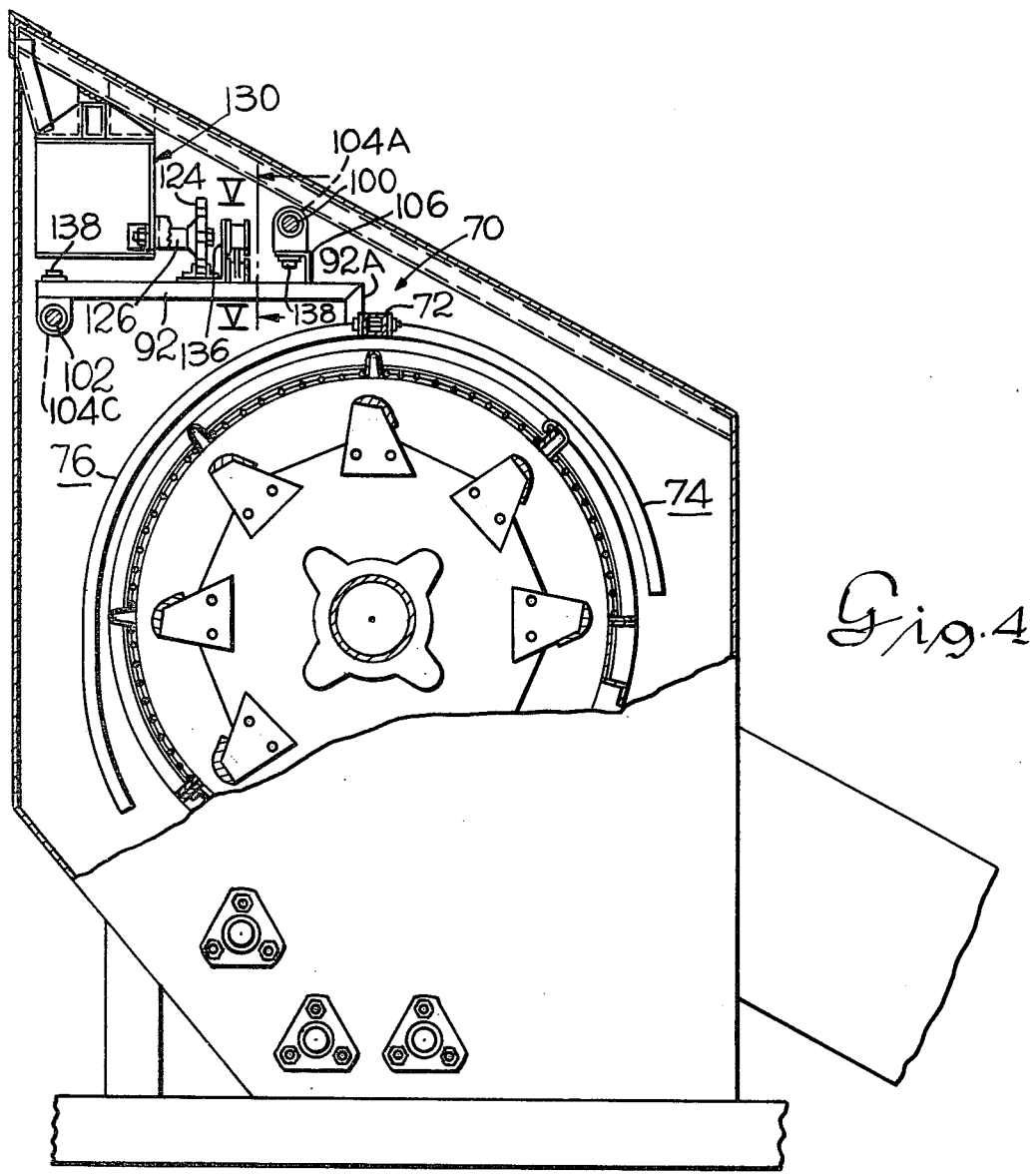
Fig. 4
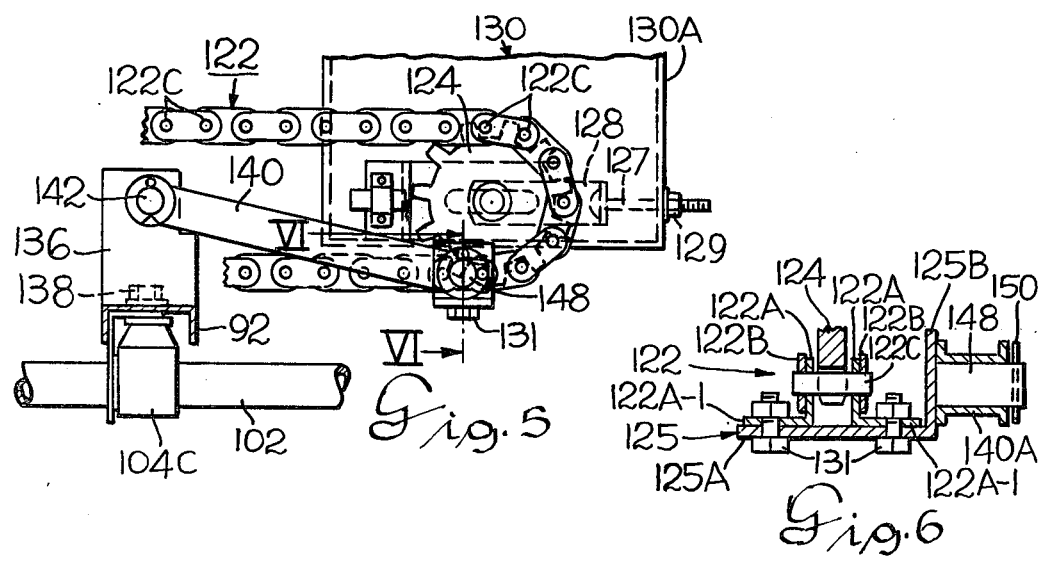
Fig. 5
Fig. 6

DRIVE MECHANISM AND SUPPORT ARRANGEMENT FOR AGITATOR OF AXIAL FLOW THRESHING CYLINDER

BACKGROUND OF THE INVENTION

Field of the Invention

This invention relates to agricultural combines and more particularly to an improved drive mechanism and support arrangement for an agitator device used for preventing an accumulation or build-up of straw or the like on the upper outer peripheral surface of a screen-like cylindrical cylinder cage surrounding an axial flow threshing cylinder which rotates within the screen-like cage, the removal of the straw or the like as just described thereby increasing the threshing capacity of the threshing apparatus.

CROSS-REFERENCE TO RELATED APPLICATIONS

The agitator drive mechanism disclosed in the present application is similar in purpose to but different in construction than, the agitator drive mechanism disclosed in U.S. Pat. No. 4,108,150 granted Aug. 22, 1978, entitled "Agitator For An Axial Flow Cylinder." The agitator and agitator drive mechanism of the present application is useful in axial flow combines such as shown in U.S. Pat. No. 4,007,744 of J. Lyle Shaver granted Feb. 15, 1977, entitled "Grain Accelerator Precleaner," and U.S. Pat. No. 4,103,691 granted Aug. 1, 1978, entitled "Combine With Means For Reducing The Bounce Of Accelerated Grain." The aforementioned United States patents are all assigned to the same assignee as the present patent application.

STATEMENT OF THE INVENTION

Accordingly, it is an object of the present invention to provide an improved drive mechanism and support arrangement for an agitator device used for preventing an accumulation or build-up of straw or the like on the upper, outer peripheral surface of a cylindrical screen-like cage surrounding an axial flow threshing cylinder in an agricultural combine, in which the agitator device is driven by the drive mechanism with an axial oscillating motion first in one axial direction and then in the opposite axial direction, and in which acceleration and deceleration of the agitator upon reversing its direction of travel is minimized.

It is another object of the invention to provide an improved drive mechanism and support arrangement for an agitator device which is used for preventing an accumulation or build-up of straw or the like on the upper, outer peripheral surface of a cylindrical screen-like cage surrounding an axial flow threshing cylinder in an agricultural combine, in which overtravel at each end of the stroke of the agitator device is eliminated, and in which the agitator device is positively guided in its path of oscillating travel by the use of guide rails secured to the stationary structure of the agricultural combine.

In achievement of these objectives, there is provided in accordance with an embodiment of the invention an improved drive mechanism and support arrangement for an agitator device used for preventing an accumulation or build-up of straw or the like on the upper outer peripheral surface of a screen-like cylindrical cylinder cage surrounding an axial flow threshing cylinder which rotates within the screen-like cage, whereby to increase the threshing capacity of the threshing apparatus. The agitator device comprises a "main beam" which extends axially of and in overlying relation to the upper outer peripheral surface of the screen-like cylinder cage. A plurality of arcuate scraper fingers are mounted on and move with the "main beam" and extend in contiguous overlying relation to the outer periphery of the cylinder cage. A carriage member is mounted for sliding movement on a pair of horizontal guide rails, and is secured to the agitator device whereby the agitator device moves with the carriage member and is supported and guided in its reciprocatory movement by the guide rails.

Reciprocating movement is imparted to the slidable carriage and to the agitator device connected thereto by an endless drive chain which is driven at a constant speed and with a continuous motion. The slidable carriage is connected to the drive chain through a drive link which is pivotally connected at its opposite ends to the drive chain and to the slidable carriage. The pivotal connection of the drive link to the chain follows the path of movement of the chain, whereby to cause reciprocatory motion of the slidable carriage and of the agitator device connected thereto. As the agitator device reciprocates above the screen-like cylinder cage, the scraper fingers of the agitator device agitate and loosen any straw or the like on the upper, outer peripheral surface of the cylinder cage to prevent an accumulation or build-up of the straw.

BRIEF DESCRIPTION OF THE DRAWINGS

Further objects and advantages of the invention will become apparent from the following description taken in conjunction with the accompanying drawings in which:

FIG. 4 is an enlarged view of the screen-like cylindrical cage surrounding the threshing cylinder and of the associated agitator mechanism in overlying relation to the screen-like cage, all viewed in a similar manner as in FIG. 1;

FIG. 5 is a view taken along line V—V of FIG. 4; and

FIG. 6 is a view taken along line VI—VI of FIG. 5.

DESCRIPTION OF THE PREFERRED EMBODIMENT

Figure 1:
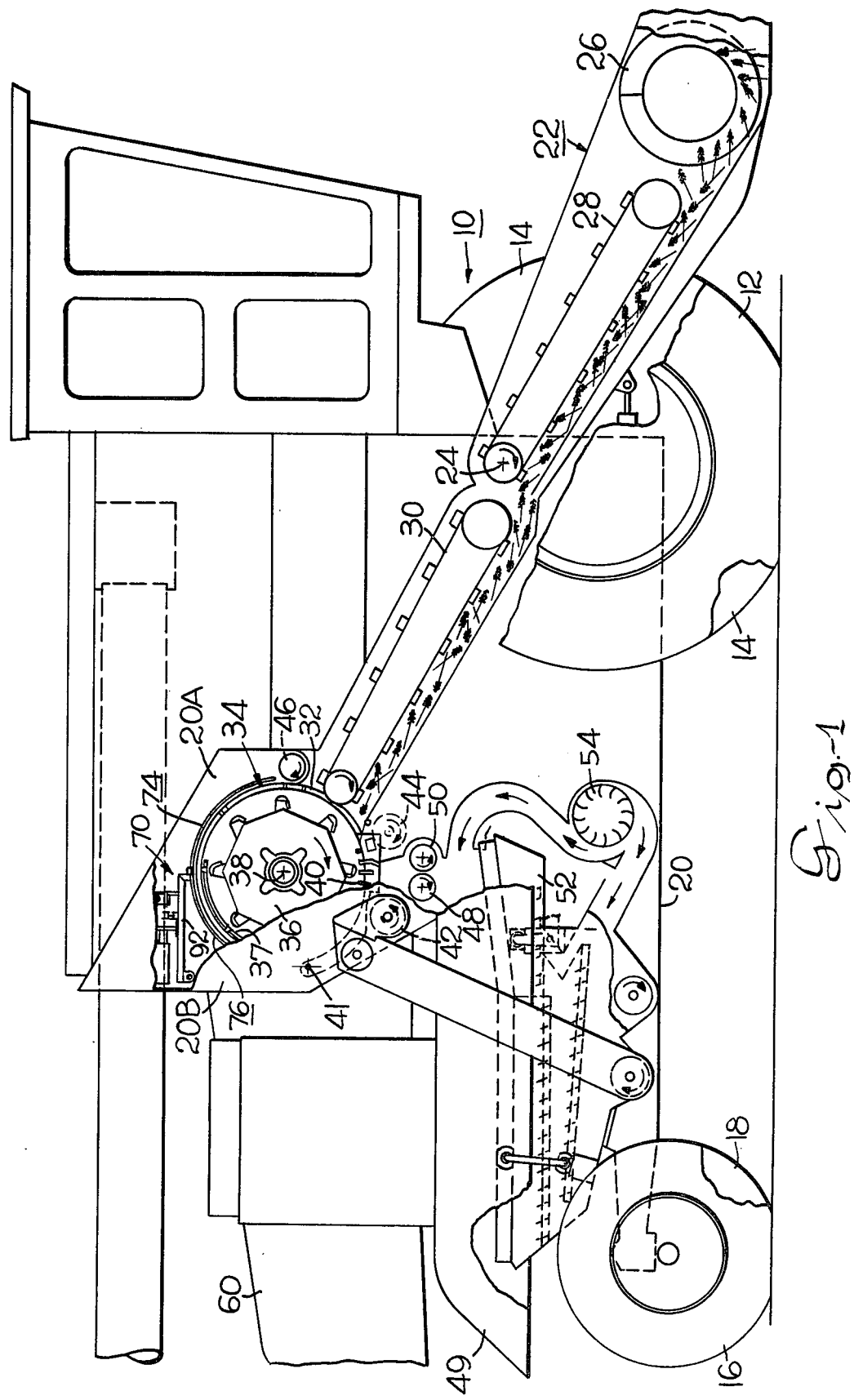
FIG. 1 is a side elevation view, with parts broken away and shown in section, of an agricultural combine incorporating the agitator drive mechanism of the invention.

Referring now to the drawings, and more particularly to FIG. 1, there is shown an agricultural combine generally indicated at 10 including a pair of front drive wheels 12, 14 and a pair of steerable rear wheels 16, 18 supporting a main frame 20. A header 22 is pivotally connected to main frame 20 on a transverse axis 24 for vertical adjustment of the cutting height. An auger 26 carried by header 22 and having oppositely pitched flights moves the cut grain inwardly from the transversely outwardly extending ends of header 22 to a location which is contiguous one axial end of the threshing apparatus but which is centrally located relative to the entire transverse width of the combine, where a first slat feeder 28 moves the cut stalks upwardly and rearwardly to a second slat feeder 30. The second slat feeder 30 in turn moves the cut stalks to an opening 32 in a stationary cylindrical threshing cage, generally indicated at 34, in which a rotatable threshing cylinder 36 is positioned. The threshing cylinder 36 is mounted in suitable bearings on the opposite side walls 20A, 20B of main frame 20 for rotation about an axis 38 which extends transversely of the longitudinal axis of combine 10.

The stationary cylindrical threshing cage, generally indicated at 34, which is essentially a cylindrical screen or sieve, includes a concave 40 at the lower portion thereof which is pivoted on an axis 41 which extends transversely of the longitudinal axis of combine 10. Threshed material passing radially outwardly through the peripheral openings of the screen-like portion of cylindrical threshing cage 34 or downwardly through the openings of concave 40 which also defines a portion of the threshing cage 34 is guided by distribution augers 42, 44 and by an overfeed auger 46 to a pair of accelerator rolls 48, 50 which accelerate threshed material downwardly toward a grain pan 52 through a layer of horizontally directed air supplied by a blower 54. As explained in the aforementioned U.S. Pat. No. 4,103,691 of J. Lyle Shaver, the horizontal air stream blows most of the chaff, which of course includes any pieces of straw present, out of the mixture of grain and chaff discharging from accelerator rolls 48, 50 the chaff passing rearwardly and thence outwardly through the downwardly opening exhaust hood 49 at the rear of the combine. The function of the accelerator rolls 48, 50 is fully described in the aforementioned U.S. Pat. No. 4,007,744 of J. Lyle Shaver, entitled "Grain Accelerator Precleaner." The straw which stays within the stationary cylindrical cage 34 is moved axially by helical ribs 37 on the inside of the threshing cage 34 to a discharge beater 56 (FIGS. 2 and 3) mounted on the rotating threshing cylinder 36 adjacent a discharge opening 58 at the rear side of one axial end of the stationary threshing cage 34. Discharge beater 56 discharges the straw from the interior of stationary cylindrical cage 34, and an additional rearwardly positioned discharge beater (not shown) induces movement of the straw rearwardly through a straw discharge chute 60 (FIG. 1)

Figure 2:
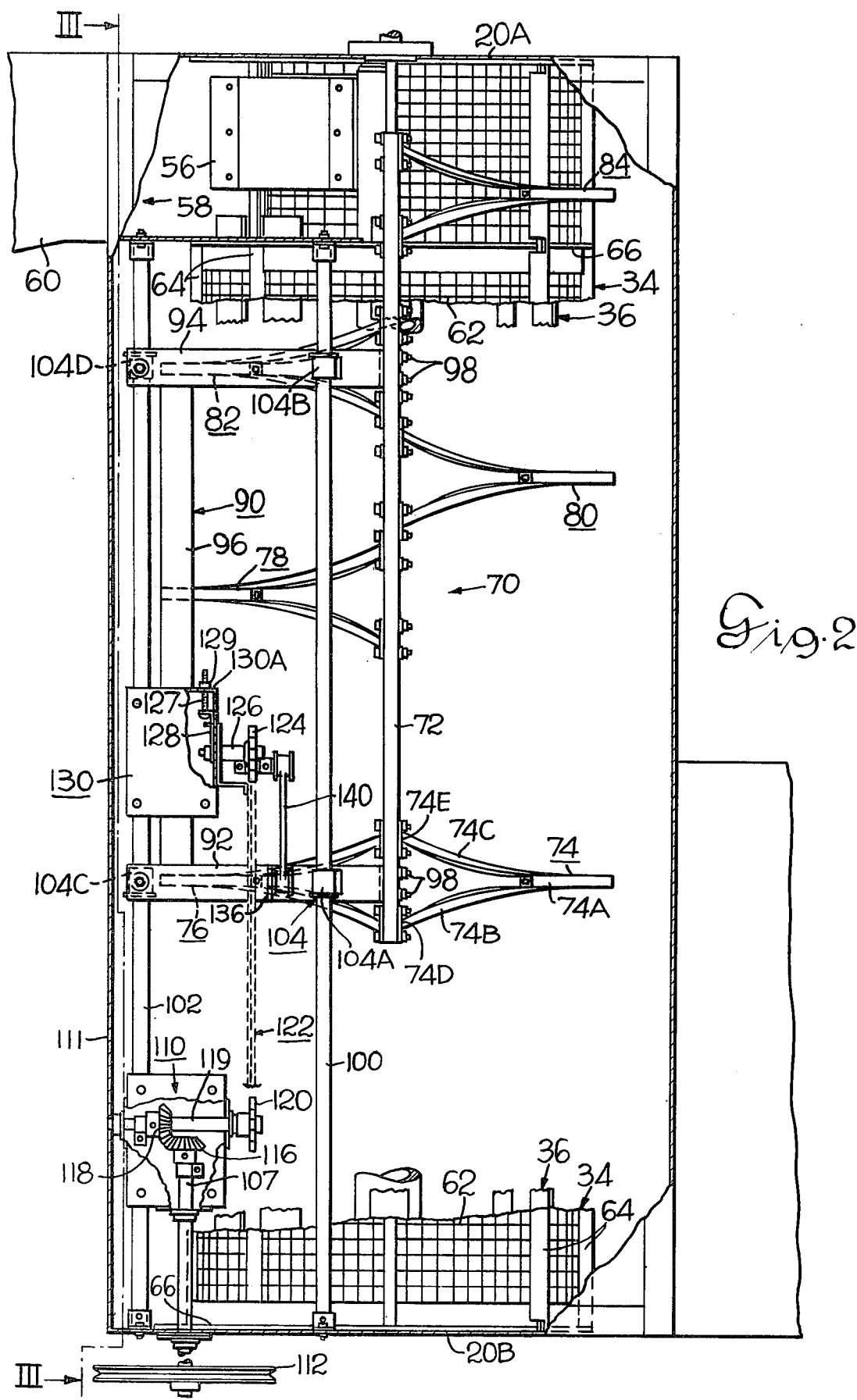
FIG. 2 is a top plan view of the agitator mechanism of FIG. 1, as viewed with the outer housing removed and with part of the cylindrical screen-like cylinder cage surrounding the threshing cylinder removed and also with part of the threshing cylinder removed whereby to more clearly show the overlying agitator mechanism of the invention.
Figure 3:
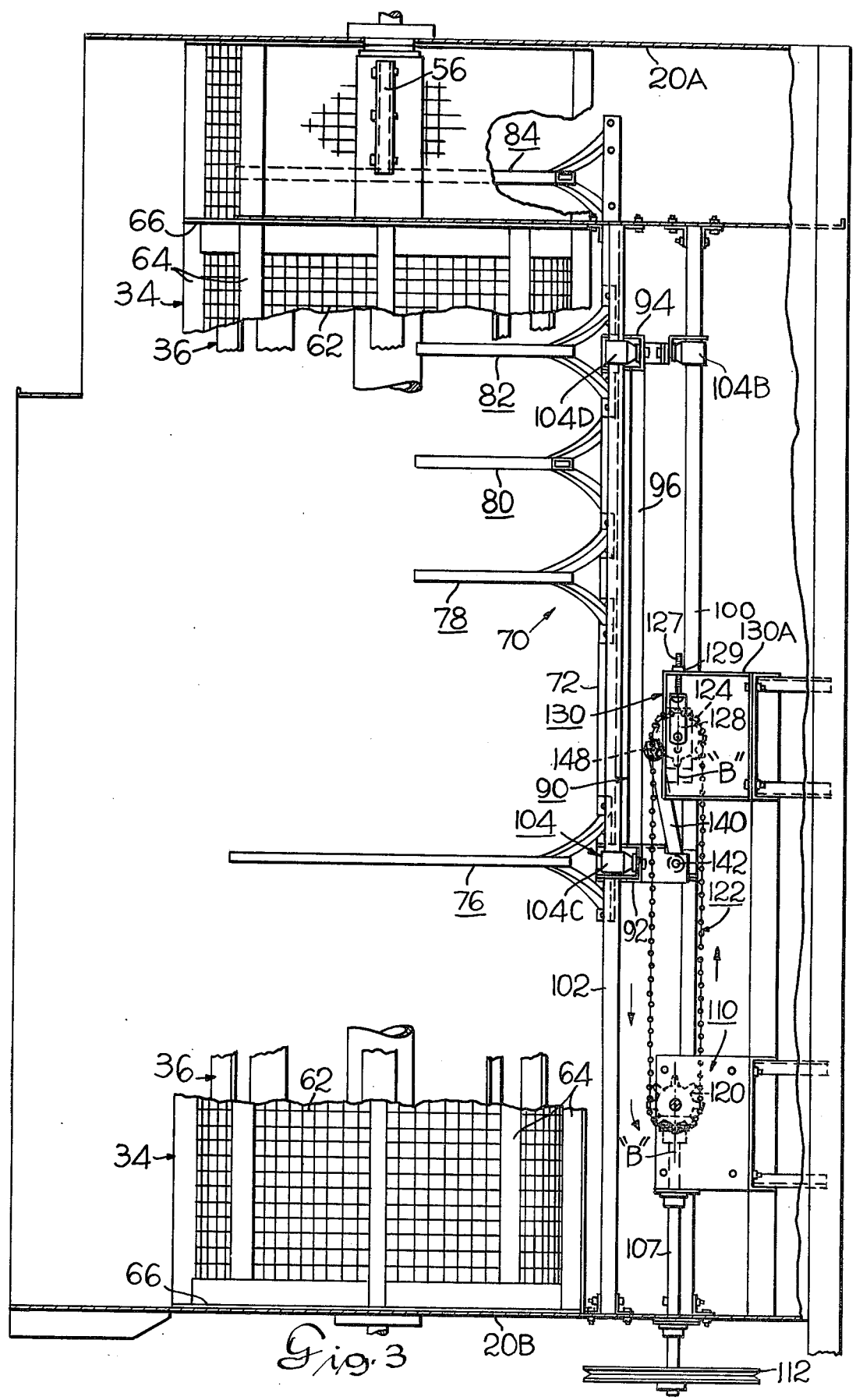
FIG. 3 is a view of the apparatus of FIGS. 1 and 2, taken substantially along line III—III of FIG. 2.

As shown in FIGS. 2, 3 and 4, the stationary cylindrical cylinder cage 34 surrounding the rotatable threshing cylinder 36 is fabricated from a woven wire screen 62 secured to longitudinal frame members 64 and annular flanges 66. It might be noted that the term "cylinder cage" applied to member 34 is intended to designate that it is a cage surrounding the rotatable threshing cylinder 36. In the prior art, until the teaching of the aforementioned U.S. Pat. No. 4,108,150 of J. Lyle Shaver, entitled "Agitator For An Axial Flow Cylinder," it had not been believed practical to provide openings in the upper part of the stationary cylinder cage such as cage 34 because of the inherent build-up of straw or other material on the upper exterior of the stationary cylindrical cage, thereby preventing egress of threshed material from the upper part of the cage. In order to alleviate or prevent build-up or accumulation of threshed material or stalk segments on the top outside surface of the cylindrical threshing cage 34, I provide an improved agitator mechanism generally indicated at 70 which will now be described.

The agitator mechanism generally indicated at 70 comprises a "main beam" 72 which extends parallel to the longitudinal axis of stationary cylindrical cage 34 and in overlying relation to cylindrical cage 34 in substantially the same vertical plane as the axis of cylindrical cage 34.

Agitator mechanism 70 also includes a plurality of arcuate scraper fingers indicated at 74, 76, 78, 80, 82 and 84, all of which are secured to and move with "main beam" 72. All of the scraper fingers just enumerated extend arcuately in contiguous and confronting relation to the outer peripheral surface of stationary cylinder 34. When agitator mechanism 70 is oscillated axially of cylindrical cage 34, as will be described hereinafter, the scraper fingers are effective to agitate and loosen any straw or other material on the upper portion of the outer peripheral surface of stationary cylinder cage 34 including the top and upper portions of the fore and aft sides of the cage 34, so that air flow created by the rotation of threshing cylinder 36 will dislodge the straw or the like from the cage and it will fall to the distribution augers 42, 44 and to the overfeed auger 46.

As best seen in the view of FIG. 2, the two scraper fingers 74 and 76 lie in a common plane with each other transverse of the longitudinal axis of stationary cylinder cage 34. Scraper finger 74 lies above the upper surface of cage 34 on one side of the longitudinal axis of the cage, with the other scraper finger 76 lying above the upper periphery of cage 34 but on the opposite side of the longitudinal axis of cage 34, as compared to the location of scrapper finger 74.

Scraper fingers 78 and 82 lie on the same side of the longitudinal axis of the stationary cage 34 and as scraper finger 76 but in axially spaced relation to each other. Scraper finger 80 lies on the same side of the longitudinal axis of cage 34 as does scraper finger 74, scraper finger 80 being axially interposed between scraper fingers 78 and 82 but lying on the opposite side of the longitudinal axis of stationary cylinder 34 from fingers 78 and 82. Scraper finger 84 lies on the same side of the longitudinal axis of cylinder cage 34 as do scraper fingers 74 and 80, scraper finger 84 being axially spaced from scraper finger 82 in the direction of the straw discharge end of the stationary cylinder cage 34.

All of the scraper fingers are constructed in the same manner, except that some scraper fingers have different arcuate lengths than others, and the construction of scraper finger 74 will be described as typical of all of the scraper fingers. Scraper finger 74 includes a portion 74A which lies circumferentially outermost from main beam 72, with two oppositely directed arcuate portions 74B and 74C which are joined at their circumferentially outermost ends to the circumferentially innermost end of scraper finger portion 74A, scraper finger portions 74B and 74C being joined as by welding at their innermost ends to flanges 74D and 74E. Flanges 74D, 74E are bolted to main beam 72 whereby to secure scraper finger 74 to main beam 72. The other scraper fingers 76, 78, 80, 82 and 84 are of similar construction to the scraper finger 74 just described except for the fact that some of the scraper fingers have a greater arcuate length than others, and all of the other scraper fingers are secured to main beam 72 in the manner just described for scraper finger 74. The two scraper fingers 76 and 84 are of longer arcuate length than scraper fingers 74, 78, 80 and 82. Typically, the longer scraper fingers 76 and 84 may each extend arcuately for approximately 130° of the outer periphery of cylinder cage 34, while the shorter scraper fingers 74, 78, 80, 82 may each extend arcuately for approximately 85° of the outer periphery of cylinder cage 34.

In order to slidably move agitator device 70 comprising main beam 72 and attached scraper fingers 74, 76, 78, etc. so as to agitate and loosen straw or other material which collects on the upper exterior surface of threshing cage 34, a reciprocably slidable movable carriage generally indicated at 90 is provided. Slidable carriage 90 comprises a pair of laterally extending axially spaced arm members 92 and 94 which are connected together by means of an axially extending connecting member 96. Arm members 92 and 94 lie in a horizontal plane which is a short distance above the horizontal plane in which main beam 72 lies. The two arm members 92 and 94 of slidable carriage 90 are secured at axially spaced locations to main beam 72 of agitator device 70 by means of downwardly extending arm portions such as 92A (FIG. 4) which are secured by bolts 98 to main beam 72.

In order to guide and support the reciprocating or oscillating carriage 90 which forms part of the agitator apparatus, a pair of laterally spaced axially-extending (i.e., in the axial dimension of cylinder cage 34) stationary guide rails are provided including a front guide rail 100 and a rear guide rail 102. The opposite ends of guide rails 100 and 102 are suitably supported by the stationary frame structure of the combine. Front guide rail 100 lies closer to the front of the combine than does rear guide rail 102. As best seen in the view of FIG. 4, front guide rail 100 lies in a horizontal plane above or higher than rear guide rail 102. Front guide rail 100 also lies in a horizontal plane above the horizontal level of main beam 72 of agitator device 70 and also above lateral arms 92 and 94 and axially extending connecting member 96 of slidable carriage 90, lateral arms 92, 94 and connecting member 96 all lying in a common horizontal plane which lies below the plane of front guide rail 100. Suitable bushing members generally indicated at 104 and specifically indicated at 104A and 104B are secured to the upper surface of the respective lateral arms 92 and 94 of slidable carriage 90, as by means of an L-shaped arm 106 best seen in FIG. 4.

Bushings 104A, 104B which are secured to the upper surface of the respective lateral arms 92, 94 of slidable carriage 90 permit carriage 90 to slidably move along front guide rail 100. In a similar manner, guide bushings generally indicated at 104 and specifically indicated at 104C and 104D are secured to and extend downwardly from the under surface of the respective lateral arms 92 and 94 of slidable carriage 90 and slidably engage rear guide rail 102 which lies in a horizontal plane below the horizontal plane of lateral arms 92, 94 of carriage 90, whereby slidable carriage 90 is also guided for reciprocatory or oscillatory sliding movement by rear guide rail 102. Thus, slidable carriage 90 to which agitator device 72 is secured is guided in its oscillatory sliding movement by both front and rear guide rails 100 and 102. Bolts 138 (FIGS. 4 and 5) secure the guide bushings 104A, 104B, 104C, 104D to their respective supports.

In order to cause a reciprocatory or oscillatory sliding movement of carriage 90 along guide rails 100 and 102, a chain drive arrangement is provided which will now be described. An input shaft 107 extends through side wall 20B of the combine and into a gear box generally indicated at 110 which is suitably positioned near rear wall 111 of the combine. Shaft 107 is suitably supported for rotation by bearings carried by side wall 20B and by gear box 110. A pulley 112 is mounted on shaft 107 exteriorally of side wall 20B, pulley 112 being driven by any suitable means whereby to rotate shaft 107. Shaft 107 drives a first bevel gear 116 (FIG. 2) which meshes with and drivingly engages a second bevel gear 118. The second bevel gear 118 is mounted on a suitably supported shaft 119 which projects though the wall of gear box 110, shaft 119 having mounted thereon a drive sprocket 120 about which a chain generally indicated at 122 is trained.

The opposite end of chain 122 is trained around a rotatable idler sprocket 124 mounted on a stub shaft 126 supported by an adjustable bracket member 128 mounted on box-like member 130. The position of bracket member 128 which supports stub shaft 126 on which idler sprocket 124 is mounted may be axially adjusted by means of bolt and nut members 127, 129 supported by wall 130A of box-like member 130, bolt member 127 engaging and imparting axial adjusting movement to bracket member 128. The axial adjustment of support bracket 128 for stub shaft 126 permits adjustment of the tension of chain 122.

As best seen in the views of FIGS. 2 and 5, a vertical bracket 136 is welded on lateral arm 92 of slidable carriage 90, bracket 136 extending upwardly from lateral arm 92. As best seen in FIG. 5, one end of a drive link 140 is pivotally secured to the upper portion of vertical bracket 136 by means of a pin 142.

The opposite end of drive link 140 is pivotally connected to drive chain 122 as best seen in the view of FIG. 6. Referring to FIG. 6, which is a section taken along line VI—VI of FIG. 5 where link 140 is pivotally connected to chain 122, there is shown a first pair of laterally spaced coextensive chain links each indicated at 122A and a second pair of laterally spaced coextensive chain links each indicated at 122B. The two links 122B have a greater lateral spacing from each other than the links 122A, so that the respective links 122B lie laterally outwardly of the respective links 122A. A laterally extending chain pin 122C connects the corresponding ends of the two laterally outer links 122B to the contiguous ends of the two laterally spaced inner links 122A. Each link of the particular pair of links 122A as shown in FIG. 6 to which the pivotal connection of drive link 140 is made is provided at the lower portion thereof with a laterally outwardly projecting flange portion each indicated at 122A-1 which may be formed integrally with the respective link 122A or alternatively may be a separate member secured by welding or the like to the corresponding link 122A. An angle member generally indicated at 125 includes a normally horizontal leg 125A and a normally vertical leg 125B. The normally horizontal leg 125A of angle member 125 is bolted by means of bolts 131 to both of the oppositely disposed flanges 122A-1 of the two laterally inner chain links 122A. Only the links of one pair of links 122A have the projecting flange portion 122A-1 to which angle member 125 is attached. A pin member 148 is welded or otherwise secured to the vertical or upstanding leg 125B of angle member 125. Pin member 148 projects laterally from upstanding leg 125B and serves as a pivot for an end of drive link 140. Thus, one end of drive link 140 is pivotally connected by means of pin 142 to the upstanding bracket 136 on lateral arm 92 of slidable carriage 90, while the opposite end of drive link 140, namely the sleeve-like or bushing-like end portion 140A of drive link 140, is pivotally connected to pin 148 carried by angle member 125 which, in turn, is secured to and travels with chain links 122A. A cotter pin 150 or the like retains end portion 140A of drive link 140 in position on pivot pin 148.

DESCRIPTION OF OPERATION

In the operation of agitator 70, chain 122 runs at a constant speed and with continuous motion and the pivotal connection 148 of drive link 140 to chain 122 follows the path of the chain. Assuming that chain 122 is driven in a counterclockwise direction with respect to the view shown in FIG. 3, and as indicated by the directional arrows in FIG. 3, it will be seen that as chain 122 moves in a counterclockwise direction, the pivotal connection of drive link 140 to lateral arm 92 of carriage 90 and also to chain 122 will cause drive link 140 to push carriage 90 from left to right relative to the view shown in FIG. 3 as the pivotal connection 148 of drive link 140 to chain 122 moves along the lower run of drive chain 122. When the pivotal connection 148 of drive link 140 to chain 122 reaches drive sprocket 120 which is seen at the right in the view of FIG. 3, the drive link pivot 148 will begin to move around drive sprocket 120 in a counterclockwise direction relative to the view of FIG. 3 and when drive link pivot 148 passes the horizontal centerline "B" of drive sprocket 120, the direction of travel of carriage 90 is reversed and drive link pivot 148 will then begin to follow the top path of travel of chain 122, and chain 122 will then begin to pull carriage 90 in the opposite direction, that is, from right to left with respect to the view of FIG. 3. When drive link pivot 148 in following the upper path of chain 122 reaches the left-hand end of the upper path of travel of chain 122 and begins to pass around idler sprocket 124 and again crosses horizontal centerline "B", the drive link 140 will again begin to push the carriage 90 from left to right to begin another cycle of reciprocating movement of slidable carriage 90.

Of course, as slidable carriage 90 is linearly reciprocated back and forth by movement of chain 122 as just described, the agitator device 70 which is rigidly secured to carriage 90 by means of the bolts 98, will also move with the movement of the carriage 90. The reciprocating movement thus imparted to the agitator device 70 will therefore cause the downwardly depending fingers 74, 76, 78, 80, 82 and 84 which are rigidly secured to main beam 72 of agitator device 70 to reciprocate back and forth with the movement of carriage 90 to thereby agitate and loosen any straw or the like on the upper exterior surface of cylindrical threshing cage 34, with the air flow created by rotation of threshing cylinder 36 cooperating to dislodge any such material from the upper exterior surface of cage 34 to prevent an accumulation of such material, thereby facilitating egress of the threshed material through the upper portion of the wire screen of stationary threshing cylinder or cage 34.

It should be noted that the use of the chain drive arrangement hereinbefore described and illustrated in the drawings for imparting a reciprocating or oscillatory movement to carriage 90 and thus to the attached agitator device 70 minimizes the acceleration and deceleration encountered at the beginning and end of each stroke of movement of agitator device 70. Furthermore, in the construction hereinbefore described and illustrated in the drawings, there is no undesirable overtravel of agitator device 70 or of any part thereof.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In a combine the combination comprising: a frame, a horizontally disposed threshing cylinder mounted on said frame for rotation about a horizontal axis, a cylindrical cage secured to said frame in surrounding relation to said threshing cylinder and having radial openings circumferentially thereabout permitting egress of threshed material, means causing axial flow of material from one axial end of said cage to the other as said threshing cylinder is rotated, an agitator including mechanical scraper fingers forming part of and movable with said agitator, said fingers being positioned in contiguous overlying relation to the upper outer peripheral surface of said cage; and a drive mechanism for reciprocating said agitator and said fingers thereof in a direction axially of said cage whereby said fingers are effective to agitate and loosen material such as straw or the like on said upper outer peripheral surface of said cage, said drive mechanism comprising an endless drive chain trained around axially spaced sprocket members, a drive link pivotally connected contiguous one end thereof to said agitator and contiguous an opposite end thereof to said chain, said pivotal connection of said drive link to said chain following the path of movement of said chain, whereby said drive link is effective to cause reciprocating axial movement of said agitator and of the scraper fingers forming part of said agitator when said chain is moving.

2. The combination defined in claim 1 including guide rail means extending in a direction parallel to the axis of said cylindrical cage, and means engaging said agitator in slidable engagement with said guide rail means whereby said agitator is guided and supported during its reciprocating axial movement.

3. The combination defined in claim 1 in which said agitator includes a carriage and a main beam secured to said carriage and axially movable therewith, said main beam extending in a direction axially of said cylindrical cage and in overlying relation to said cylindrical cage, said scraper fingers being mounted on and axially movable with said main beam and said carriage, guide rail means extending in a direction parallel to the axis of said cylindrical cage, and means engaging said carriage in slidable engagement with said guide rail means whereby said carriage is guided and supported during its reciprocating axial movement.

4. The combination of claim 1 wherein said scraper fingers are spaced from each other axially in a direction parallel to said horizontal axis.

5. The combination of claim 1 wherein said fingers are arcuate.

6. The combination of claim 3 wherein said main beam lies in substantially the same vertical plane as the horizontal axis of said cylindrical cage.

7. The combination of claim 3 wherein said fingers extend arcuately in opposite directions from said main beam.

* * * * *